April 9, 1957  J. H. BORNZIN ET AL  2,787,949
HAY PUSHING ATTACHMENT FOR BALERS
Filed March 30, 1954
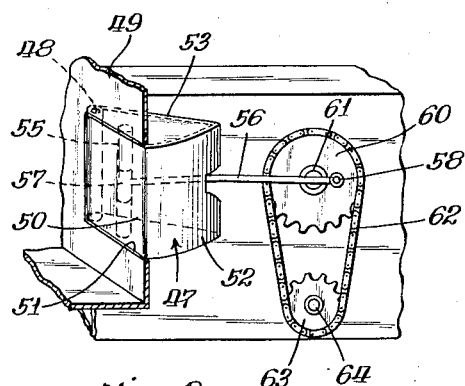
Fig. 3.
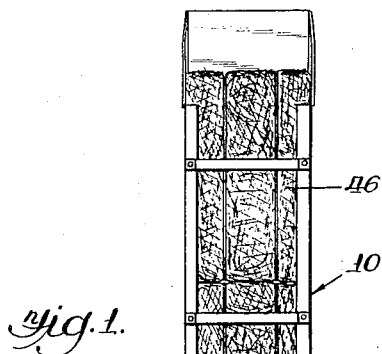
Fig. 1.
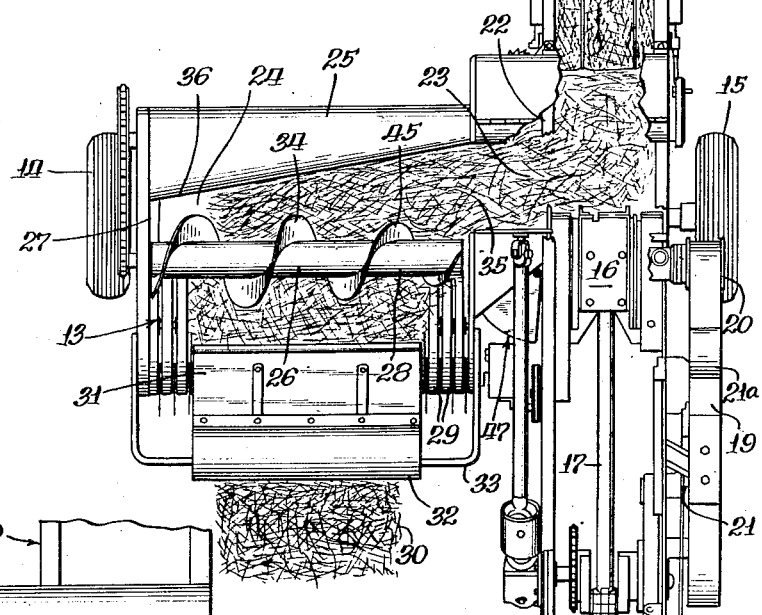
Fig. 2.
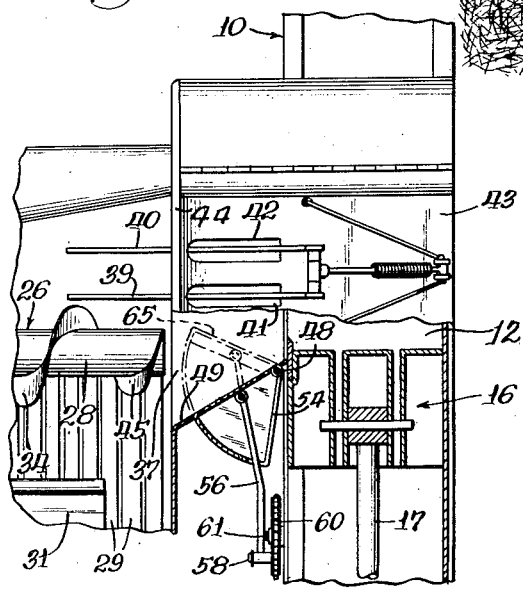
INVENTORS.
James H. Bornzin
Ulysses S. Currier
and James M. Francis
Guy O. Tufts
Paul O. Reppel Atty.

United States Patent Office 2,787,949
Patented Apr. 9, 1957

2,787,949

HAY PUSHING ATTACHMENT FOR BALERS

James H. Bornzin, Ulysses G. Currier, James M. Francis, and Guy O. Tufts, Memphis, Tenn., assignors to International Harvester Company, a corporation of New Jersey Application March 30, 1954, Serial No. 419,686

5 Claims. (Cl. 100—142)

This invention relates to a new hay pushing attachment for balers.

Agricultural harvesting machines are constantly confronted with the task of moving or transporting harvested material from the point of initial grasping of the material until such time as the material is subsequently treated, either as to the formation of packages or possibly the threshing of the harvested material. Hay balers are a form of harvesting machine which primarily function to pick up previously cut hay and deliver that hay to a chamber where it is placed under compression and tied in a compressed bale-like formation.

It is, therefore, a principal object of the present invention to provide means associated with the unjournalled discharging end of an auger conveyor for pushing the hay from its position adjacent the open discharge end of the auger rearwardly therefrom into the path of clawing type fingers which feed the hay into a bale-forming chamber.

An important object of this invention is the provision of means in a hay baler for facilitating the positive removal of grain from the discharge end of a platform auger by an oscillating pushed element which acts as an auxiliary means for moving hay rearwardly in addition to the forward motion of the hay baler through hay which is to be baled.

Another and further important object of this invention is to supply a hay butting means which is adapted to reciprocate through the position of hay discharge from an unjournalled end of a harvester platform auger whereupon the hay material is positively transferred away from the position immediately adjacent the end of the auger conveyor to a position within the scope of another hay feeding means.

Other and further important objects and advantages will become apparent from the disclosures in the following specification and accompanying drawing:

Fig. 1 is a top plan view of a hay baler incorporating the principles of this invention and having parts thereof broken away in order to disclose the present invention.

Fig. 2 is an enlarged detail sectional view of a portion of the top plan view as shown in Fig. 1.

Fig. 3 is a perspective view of the hay pusher of this invention.

As shown in the drawing, the reference numeral 10 indicates generally a hay baler adapted to have a hitch mechanism 11 at the forward end thereof for attachment to the drawbar of a pulling tractor (not shown). The baler 10 includes generally a longitudinally extending bale-forming chamber 12 and a laterally extending platform 13 which is adapted to pick up hay from a windrow and the like and deliver it into the bale-forming chamber 12. The baler 10 is carried on spaced ground-engaging wheels 14 and 15 and as the tractor pulls on the hitch mechanism 11 the wheels ride the ground for easy transportation of the implement. The bale-forming chamber has a plunger 16 which is reciprocably driven therein by a pitman 17 and a crank 18 which receives its rotational drive from an engine (not shown) through the medium of a relatively wide flat belt 19. A pulley 20 carries the upper rearward end of the belt 19 and a large pulley or flywheel 21 carries the lower forward end of the flat belt 19. An idler pulley 21a is adapted to impart tension to the belt 19 to supply rotative drive to the crank 18 which, in turn, effects fore and aft reciprocation of the bale compressing plunger 16. The plunger 16 is adapted to move from a position as shown in Fig. 1 to a position wherein the forward end thereof has passed the rearward edge 22 of a vertical side opening 23 in the bale-forming chamber 10 adjacent the platform 13.

The platform 13 has a deck portion 24 and a back wall 25 of gradually decreasing width from the outer end thereto to a position adjacent the side opening 23 in the bale-forming chamber 12. A transversely disposed auger conveyor 26 is journally mounted at its outer end in an end wall 27 whereas the inner end 28 of the auger is free and unjournalled to permit the passage of hay therethrough without entanglement. A pick-up cylinder 29 is adapted to lift hay 30, or other material to be baled, from a windrow laid in a field. A hold-down member 31 is pivoted at its forward end 32 on a bale-like bracket member 33. This hold-down member 31 is adapted to exert a downward pressure on the hay 30 over the pick-up cylinder 29 whereupon the hay is delivered substantially to the underside of the auger conveyor 26. Although the auger conveyor 26 is disposed at right angles to the longitudinally extending line of draft the spiral flight 34 thereon causes the hay now designated by the numeral 35 to move in a generally angular direction coinciding substantially with the angularly disposed front edge 36 of the rear wall 25 of the platform 13.

Certain of the hay is discharged directly through the unjournalled end 28 of the auger into a space designated as 37. The forward motion of the hay baler of this invention through a field is normally sufficient to cause any hay reaching the space 37 to be moved rearwardly into a space 38 through which reciprocating packer or material clawing fingers 39 and 40 operate to carry the hay from the platform 13 into and through the side opening 23 of the bale-forming chamber 12. This is true because the incoming hay tends to push the previously harvested hay rearwardly. The packer fingers 39 and 40 are mounted on top of the bale-forming chamber 12 and are adapted to move as in Crumb et al. 2,450,082 in a sweeping motion through the space 38 by operation through elongated slots 41 and 42 in a top sheet or cover member 43 extending from the top of the bale-forming chamber and thence laterally outwardly and upwardly to a terminal edge 44 substantially in alignment with the inner terminal end 28 of the auger conveyor 26.

Attention is directed to the construction of the spiral flight 34 on the auger conveyor 26 wherein the last convolution 45 thereof adjacent the discharge end 28 is of a lesser diameter than the remaining extent of the screw flight in order to provide adequate clearance between the packer finger 39 and the auger 26. It should be noted that the packing finger 39 has its outer edge in direct alignment with the second convolution of the auger flight 34. This insures positive control of the hay throughout the transportation of hay from the windrow 30 into the bale-forming chamber 12 whereupon the hay is compressed and packaged into bales, as shown at 46.

In order to eliminate any possibility of failure to clear chamber 37 of harvested hay, a pusher member shown generally in Fig. 3 at 47 is arranged for oscillating movement to butt or otherwise push the hay from the chamber 37 to the position 38 whereupon it is positively acted upon by the packer fingers 39 and 40 to feed it into the bale forming chamber 12. The pusher member 47 is hinged at 48 in a vertically disposed diagonally positioned wall member 49 which forms the forward defining extent of the chamber 37. The pusher 47 has a forward face 50 which is in alignment with and forms a flush continuation of the vertical wall 49 within an opening 51 therein. Thus, when the hay butting means 47 is in its rearmost position, as shown in Fig. 3, it is inoperative and the baler may function in the ordinary manner without the assistance of an auxiliary butting or pushing means. The pusher 47 is substantially triangular in cross section in that it includes an arcuate wall 52 adjoining the outer end of the front face 50 opposite the vertical hinge 48 and completes the triangle by means of vertically spaced-apart straps 53 and 54 to constitute the back wall of the pusher. A vertical rod member 55 is affixed to the pusher member 47 in a vertical position parallel to the vertical hinge 48 and immediately back of the front wall 50 of the pusher. A link arm or pitman 56 has a sleeve 57 in substantially a T shape with the top of the T journalled for swivel rotation about the vertical shaft 55. The rearward end of the link arm 56 is pivotally mounted on a crank pin 58 on a sprocket 60, as clearly shown in Fig. 3. The sprocket 60 is mounted on a shaft 61 which is journally mounted in the side wall of the bale-forming chamber 12 and is driven by means of a chain 62 which, in turn, receives rotational drive from a sprocket 63. The sprocket 63 is mounted on a shaft 64 which is driven by means of suitable operating mechanism from a driving engine (not shown).

In operation the hay baler is adapted to traverse a field in which the hay is positioned in windrows. The hay is picked up by the pick-up cylinder 29 whereupon it is guided by means of the hold-down member 31 to a position on the deck 27 of the platform 13 beneath the auger conveyor 26. The auger conveyor cooperating with the stationary deck 27 feeds hay laterally through the open end 28 thereof and also rearwardly along the inclined edge 36 of the rear wall 25 of the platform whereafter the packer fingers 39 and 40 convey the hay into the bale-forming chamber for the forming of compact bales of hay 46. The novel feature of this invention is the employment of the pusher member 47 which is adapted to oscillate through the chamber wall opening 37 and move hay or other material to be baled from its position adjacent the discharge end of the auger 26 and into the path of the sweeping fingers 39 and 40. It should be understood that the arcuate and relatively solid wall 52 of the pusher member 47 prevents hay from getting into and clogging operation of the pusher member at a time when it is in its forward advanced position as shown in dotted lines at 65. The curved wall 52 facilitates the withdrawal of the pusher member 47 to its home position, as shown in Fig. 3, whereafter the space 37 may be reoccupied with hay from the auger 26 for subsequent delivery to the location 38 and feeding into the bale chamber 12 by means of the packer fingers 39 and 40.

Obviously, numerous details of construction may be varied without departing from the principles disclosed herein and we, therefore, do not propose limiting the patents granted hereon otherwise than as necessitated by the appended claims.

What is claimed is:

1. In a hay baler of the type having a transversely extending hay pick-up platform, and a longitudinally extending bale-forming chamber, an auger conveyor on said platform and adapted to feed hay laterally through a discharge end thereof to one side of said platform, means mounting the end of the auger conveyor away from the discharge end on said platform so as to leave the discharge end open and unsupported, said platform having a space behind the discharge end of said auger conveyor, hay packing fingers movable through said space and into a bale-forming chamber, and including a hay pusher hingedly mounted on said platform adjacent the unsupported discharge end of said auger conveyor, and means oscillatably swinging said hay pusher about its hinge, whereby hay discharged from the end of said auger conveyor is pushed into the space through which the hay packing fingers move, said platform having a wall extending diagonally from the unsupported end of the auger generally laterally into said space adjoining the discharge end of the auger conveyor, said wall having an opening intermediate the ends thereof, and said hay pusher including an operating surface within said wall opening and swingable from a position flush with said wall to a position away from said wall and adjacent the space through which the packing fingers move.

2. A device as set forth in claim 1 in which said hay pusher also includes a curved wall joining the end of the operating surface closest to the discharge end of the auger conveyor and extending rearwardly whereby when the operating surface is swung forwardly to push hay the curved wall closes the space between the operating surface and the diagonal wall.

3. In a hay baler of the type having a transversely extending hay pick-up platform, and a longitudinally extending bale-forming chamber, an auger conveyor on said platform and adapted to feed hay laterally through a discharge end thereof to one side of said platform, means mounting the end of the auger conveyor away from the discharge end on said platform so as to leave the discharge end open and unsupported, said platform having a space behind the discharge end of said auger conveyor, hay packing fingers movable through said space and into a bale-forming chamber, and including a hay pusher hingedly mounted on said platform adjacent the unsupported discharge end of said auger conveyor, and means oscillatably swinging said hay pusher about its hinge, whereby hay discharged from the end of said auger conveyor is pushed into the space through which the hay packing fingers move, said hay pusher being substantially triangular in cross section with one of the walls thereof acting to push hay.

4. In a hay baler of the type having a transversely extending hay pick-up platform, and a longitudinally extending bale-forming chamber, an auger conveyor on said platform and adapted to feed hay laterally through a discharge end thereof to one side of said platform, means mounting the end of the auger conveyor away from the discharge end on said platform so as to leave the discharge end open and unsupported, said platform having a space behind the discharge end of said auger conveyor, hay packing fingers movable through said space and into a bale-forming chamber, and including a hay pusher hingedly mounted on said platform adjacent the unsupported discharge end of said auger conveyor, and means oscillatably swinging said hay pusher about its hinge, whereby hay discharged from the end of said auger conveyor is pushed into the space through which the hay packing fingers move, said platform having a diagonal wall extending from a position adjacent the unsupported end of the auger laterally and rearwardly into said space adjoining the discharge end of the auger conveyor, said diagonal wall having an opening intermediate the ends thereof, and said hay pusher including an operating surface oscillatable within said diagonal wall opening.

5. In a hay baler of the type having a transversely extending hay pick-up platform, and a longitudinally extending bale-forming chamber, an auger conveyor on said platform and adapted to feed hay laterally through a discharge end thereof to one side of said platform, means mounting the end of the auger conveyor away from the discharge end on said platform so as to leave the discharge end open and unsupported, said platform having a space behind the discharge end of said auger conveyor, hay packing fingers movable through said space and into a bale-forming chamber, and including a hay pusher, vertical hinge means mounting said hay pusher on said platform adjacent the unsupported discharge end of said auger conveyor, and means oscillatably swinging said hay pusher through a horizontal path about its vertical hinge means, whereby hay discharged from the end of said auger conveyor is pushed into the space through which the hay packing fingers move.

References Cited in the file of this patent

UNITED STATES PATENTS

| | | |
|---|---|---|
| 657,607 | Luzatto | Sept. 11, 1900 |
| 1,038,255 | Wilson | Sept. 10, 1912 |
| 2,158,745 | Dalimata | May 16, 1939 |
| 2,450,082 | Crumb et al. | Sept. 28, 1948 |
| 2,552,888 | Druetta | May 15, 1951 |
| 2,608,283 | Oehler | Aug. 26, 1952 |
| 2,674,839 | Russell | Apr. 13, 1954 |

FOREIGN PATENTS

| | | |
|---|---|---|
| 1,069,699 | France | Feb. 17, 1954 |